(12) United States Patent
Ono et al.

(10) Patent No.: US 7,147,090 B2
(45) Date of Patent: Dec. 12, 2006

(54) HYDRODYNAMIC TORQUE TRANSMITTING DEVICE

(75) Inventors: Masahiro Ono, Suita (JP); Takeshi Kawamoto, Yao (JP); Shinji Fujimoto, Hirakata (JP); Hideki Miura, Hirakata (JP)

(73) Assignee: Exedy Corporation, Osaka (JP)

( * ) Notice: Subject to any disclaimer, the term of this patent is extended or adjusted under 35 U.S.C. 154(b) by 39 days.

(21) Appl. No.: 10/811,918

(22) Filed: Mar. 30, 2004

(65) Prior Publication Data

US 2004/0211173 A1  Oct. 28, 2004

(30) Foreign Application Priority Data

Apr. 23, 2003 (JP) ............................. 2003-119041

(51) Int. Cl.
  *F16H 45/02* (2006.01)
(52) U.S. Cl. ..................................... 192/3.29; 192/212
(58) Field of Classification Search ................ 192/3.29
  See application file for complete search history.

(56) References Cited

U.S. PATENT DOCUMENTS

| | | | | |
|---|---|---|---|---|
| 5,575,363 A | * | 11/1996 | Dehrmann et al. .......... | 192/3.3 |
| 5,868,228 A | * | 2/1999 | Fukushima ................. | 192/3.29 |
| 6,024,195 A | * | 2/2000 | Hinkel ....................... | 192/3.29 |
| 6,062,358 A | * | 5/2000 | Otto et al. .................. | 192/3.29 |
| 6,085,879 A | * | 7/2000 | Ebinger et al. .............. | 192/3.3 |
| 6,142,272 A | * | 11/2000 | Meisner et al. ............. | 192/212 |
| 6,193,037 B1 | * | 2/2001 | Middelmann et al. ..... | 192/3.29 |
| 6,267,213 B1 | * | 7/2001 | Yamaguchi et al. ........ | 192/3.29 |
| 6,533,088 B1 | * | 3/2003 | Hinkel ....................... | 192/3.29 |
| 6,708,804 B1 | * | 3/2004 | Krause et al. ............. | 192/3.29 |
| 6,712,186 B1 | * | 3/2004 | Arhab ....................... | 192/3.29 |
| 2001/0020563 A1 | * | 9/2001 | Sasse et al. ................ | 192/212 |
| 2002/0175037 A1 | * | 11/2002 | Wack et al. ............... | 192/3.29 |

FOREIGN PATENT DOCUMENTS

| | | | |
|---|---|---|---|
| JP | 5-231495 A | | 9/1993 |
| JP | 9-133197 A | * | 5/1997 |
| JP | 2001-355703 A | * | 12/2001 |

* cited by examiner

*Primary Examiner*—Rodney H. Bonck
(74) *Attorney, Agent, or Firm*—Global IP Counselors, LLP

(57) ABSTRACT

A hydrodynamic torque transmitting device is disclosed that overcomes problems created by the presence of a thrust washer therein. In a torque converter 1 according to the present invention, a piston 41 is disposed between a front cover 2 and a turbine 4 to form a front chamber F on a front cover side and a rear chamber R on a turbine side, and can move toward and away from the front cover 2 by means of a hydraulic pressure differential created between the front and rear chambers F and R. The piston 41 has a disk shaped body 41a, and a frictional coupling portion (friction facing 61) disposed on a outer peripheral portion of the body 41a that serves to frictionally engage with the front cover 2. The turbine hub 23 and the front cover 2 have opposing portions (63, 23b) that oppose each other across an axial space. The piston 41 has a support portion 48 that axially supports the turbine 4 when the piston 41 moves to a position near the front cover. When the piston 41 moves to a position closest to the front cover 2, an axial space is maintained between the opposing portions (63, 23b).

18 Claims, 1 Drawing Sheet

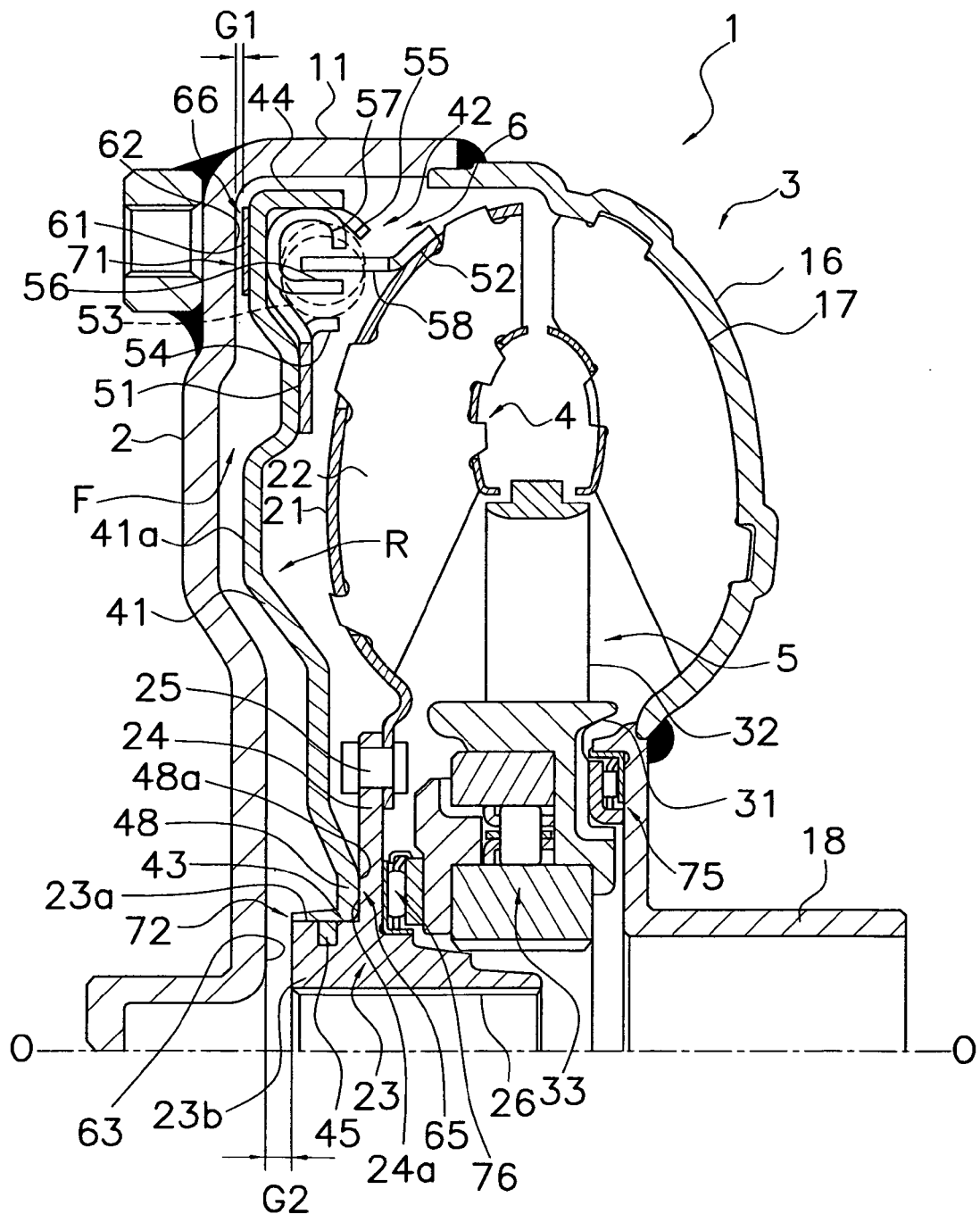

HYDRODYNAMIC TORQUE TRANSMITTING DEVICE

BACKGROUND OF THE INVENTION

1. Field of the Invention

The present invention relates to a torque converter, and more particularly to a torque converter provided with a lockup clutch.

2. Background Information

A torque converter includes three types of vane wheels (impeller, turbine and stator) in the interior thereof, and serves to transmit torque by means of a working fluid (working oil) in the interior thereof. The impeller is fixed to a front cover that transmits torque, and an impeller shell and the front cover form a fluid chamber that is filled with the working fluid. The turbine is disposed inside the fluid chamber opposite the impeller. When the impeller rotates, the working fluid flows from the impeller toward the turbine to rotate the turbine. As a result, torque is transmitted from the turbine to a main drive shaft of a transmission.

A lockup clutch is disposed in a space between the front cover and the turbine, and serves to mechanically couple the front cover to the turbine and thereby directly transmit torque therebetween. The lockup clutch is primarily composed of a piston, and an elastic coupling mechanism that serves to couple the piston to the turbine or another output member. The piston is disposed between the front cover and the turbine so as to form a front chamber on the front cover side and a rear chamber on the turbine side. As a result, the piston can move toward and away from the front cover by means of a pressure differential created between the front and rear chambers. A friction facing is provided on the front cover side of the outer peripheral portion of the piston in order to form a frictional coupling portion.

The elastic coupling mechanism is composed of a drive member fixed, for example, to the piston, a driven member fixed to a member on the turbine side, and elastic members such as coil springs disposed between the drive and driven members and capable of torque transmission.

A thrust washer is usually disposed in the axial direction between an inner peripheral portion of the front cover and a turbine hub. The thrust washer functions to support the thrust load of the turbine. In addition, a plurality of grooves are formed in an end surface in the axial direction of the thrust washer that radially extend through the thrust washer so that the working fluid can flow between the front chamber of the torque converter and the oil passage of the main drive shaft via these grooves (see, for example, Japanese Unexamined Patent Application Publication No. H05-231495).

When a conventional thrust washer is provided in a torque converter, the number of parts will increase as well as the overall cost thereof. Costs will increase when a thrust washer is provided because the surface on which the thrust washer slides must be processed to improve the precision thereof.

In view of the above, there exists a need for a hydrodynamic torque transmitting device which overcomes the above mentioned problems in the prior art. This invention addresses this need in the prior art as well as other needs, which will become apparent to those skilled in the art from this disclosure.

SUMMARY OF THE INVENTION

An object of the invention is to solve the problems caused by a thrust washer in a hydrodynamic torque transmitting device having a lockup clutch that includes a piston.

In a first aspect of the present invention, a hydrodynamic torque transmitting device includes an input side front cover, an impeller, a turbine, and a piston. The impeller is coupled to the front cover to form a fluid chamber together with the front cover. The turbine has a vane portion disposed inside the fluid chamber and opposite the impeller, and a turbine hub. The piston is disposed so as to divide a space between the front cover and the turbine into a front chamber on a front cover side and a rear chamber on a turbine side, and is capable of moving toward and away from the front cover by means of a pressure differential created by fluid between the front chamber and rear chamber. The piston includes a disk-shaped main body, and a frictional coupling portion disposed on an outer peripheral portion of the main body that is capable of frictional coupling with the front cover. The turbine hub and the front cover respectively include portions that are mutually opposed to each other across a space in an axial direction (hereinafter referred to as opposing portions). The piston includes a support portion that supports the turbine in the axial direction when the piston moves toward the front cover. When the piston moves to a position closest to the front cover, a gap in the axial direction is maintained between the opposing portions so that a load from the turbine will not be applied to the front cover.

In this hydrodynamic torque transmitting device, when the pressure in the front chamber is lower than that in the rear chamber, this pressure differential moves the piston toward the front cover to couple the frictional coupling portion to the front cover (i.e., the lockup clutch is engaged). When the pressure in the front chamber exceeds the pressure in the rear chamber, this pressure differential moves the piston away from the front cover so that the frictional coupling portion is spaced from the front cover (i.e., the lockup clutch is released).

In this hydrodynamic torque transmitting device, the support portion of the piston axially supports the turbine in the lockup-engaged state, and as a result, an axial space is maintained between the opposing portions when the piston is in the position closest to the front cover and the load from the turbine is not applied to the front cover. Thus, in contrast to the conventional configuration, the thrust washer can be eliminated because the piston bears the thrust load of the turbine.

According to a second aspect of the present invention, the opposing portions of the hydrodynamic torque transmitting device of the first aspect are directly opposed to each other in the axial direction. When the piston moves to the position furthest from the front cover, the axial distance between the opposing portions is longer than the axial distance between the frictional coupling portion and the front cover.

In this hydrodynamic torque transmitting device, there are no other members disposed between the opposing portions. In addition, when the piston moves to a position near the front cover, the frictional coupling portion comes into contact with the front cover to stop the movement of the piston. When this occurs, the piston axially supports the turbine and an axial space is maintained between the opposed portions. Thus, costs can be lowered because the thrust washer can be eliminated.

According to a third aspect of the present invention, the support portion of the piston of the hydrodynamic torque transmitting device of the first or second aspect is an annular portion having a constant radial width.

In this hydrodynamic torque transmitting device, when for example an elastic coupling mechanism operates in the lockup-engaged state in response to the input of torque variations from an engine, the support portion of the piston slides on the turbine while they are pressed together by means of the thrust load of the turbine. With this configuration, bearing stress on the sliding portions will be low and, as a result, little wear will be produced, because the support portion of the piston is an annular portion having a constant radial width.

According to a fourth aspect of the present invention, the radial width of the support portion of the piston of the hydrodynamic torque transmitting device of the third aspect is larger than the plate thickness of the piston.

In this hydrodynamic torque transmitting device, when for example an elastic coupling mechanism operates in the lockup-engaged state in response to the input of torque variations from an engine, the support portion of the piston slides on the turbine while they are pressed together by means of the thrust load of the turbine. With this configuration, bearing stress on the sliding portions will be low and, as a result, little wear will be produced, because the support portion of the piston has a radial width larger than the plate thickness of the piston.

According to a fifth aspect of the present invention, the radial width of the support portion of the piston of the hydrodynamic torque transmitting device of the fourth aspect is two or more times larger than the plate thickness of the piston.

In this hydrodynamic torque transmitting device, when for example an elastic coupling mechanism operates in the lockup-engaged state in response to the input of torque variations from an engine, the support portion of the piston slides on the piston while they are pressed together by means of the thrust load of the turbine. With this configuration, bearing stress on the sliding portions will be low and, as a result, little wear will be produced, because the support portion of the piston has a radial width two or more times larger than the plate thickness of the piston.

According to a sixth aspect of the present invention, the turbine side of the support portion of the piston of the hydrodynamic torque transmitting device of any one of the first to fifth aspects has a flat surface that extends perpendicular to the rotation axis.

In this hydrodynamic torque transmitting device, when for example an elastic coupling mechanism operates in the lockup-engaged state in response to the input of torque variations from an engine, the support portion of the piston slides on the piston while they are pressed together by means of the thrust load of the turbine. With this configuration, bearing stress on the sliding portions will be low and, as a result, little wear will be produced, because the turbine side of the support portion of the piston has a flat surface that extends perpendicular to the rotation axis.

According to a seventh aspect of the present invention, the piston of the hydrodynamic torque transmitting device of any one of the first to sixth aspects includes a cylindrical portion that extends from an inner peripheral edge of the main body toward the front cover side. The inner peripheral surface of the cylindrical portion is supported on the outer peripheral surface of the turbine hub such that the cylindrical portion can move in the rotational direction and the axial direction.

In this hydrodynamic torque transmitting device, the piston is radially positioned by the turbine hub via the cylindrical portion.

According to an eighth aspect of the present invention, the axial position of the axial end of the cylindrical portion of the hydrodynamic torque transmitting device according to the seventh aspect matches the axial engine side surface of the turbine hub.

According to a ninth aspect of the present invention, a portion of the turbine hub that is in contact with the cylindrical portion of the hydrodynamic torque transmitting device according to the eighth aspect includes a seal member that seals an inner peripheral portion between the front chamber and the rear chamber.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

The FIGURE shows a cross section of a torque converter according to one embodiment of the present invention.

DETAILED DESCRIPTION OF THE PREFERRED EMBODIMENTS

A cross section of a torque converter 1 according to an embodiment of the present invention is shown in the Figure. Line O—O in the Figure is the rotational axis of the torque converter 1.

Overall Configuration

The torque converter 1 is primarily composed of a front cover 2, an impeller 3, a turbine 4, a stator 5 and a lockup clutch 6.

The front cover 2 can be mounted to a component (not shown in the figures) on the engine side, and torque from an engine (not shown in the figures) is inputted thereto. A cylindrical portion 11 is arranged on the outer peripheral edge of the front cover 2, and projects away from the engine (i.e., toward the transmission).

The impeller 3 includes an impeller shell 16, and a plurality of impeller blades 17 fixed to the impeller shell 16. The outer peripheral edge of the impeller shell 16 is fixed to the cylindrical portion 11 of the front cover 2. The impeller shell 16 and the front cover 2 form a fluid chamber. Further, the impeller 3 includes an impeller hub 18 that is fixed to the inner peripheral edge of the impeller shell 16.

The turbine 4 is disposed in the interior of the fluid chamber opposite the impeller 3. The turbine 4 includes an turbine shell 21, and a plurality of turbine blades 22 fixed to the turbine shell 21. The turbine 4 further includes a turbine hub 23 that serves to transmit torque to the transmission (not shown in the figures). The main portion of the turbine hub 23 is tubular in shape, and a flange 24 is formed on the outer peripheral surface thereof. The inner peripheral end portion of the turbine shell 21 is fixed to the flange 24 by means of a plurality of rivets 25. Note that the inner peripheral side of the main portion of the turbine hub 23 includes spline grooves 26 that engage with a main drive shaft (not shown) of the transmission.

The stator 5 regulates the direction of the working fluid that is returned from the turbine 4 to the impeller 3. The stator 5 is disposed between the inner peripheral sides of the impeller 3 and the turbine 4. The stator 5 includes a stator shell 31, and a plurality of stator blades 32 fixed on the stator shell 31. The inner peripheral side of the stator 5 is supported on a stationary shaft (not shown) via a one-way clutch 33. A first thrust bearing 75 is axially disposed between the stator shell 31 and the impeller hub 18. A second thrust bearing 76 is disposed between the one-way clutch 33 and the flange 24.

The lockup clutch 6 mechanically couples the front cover 2 to the turbine 4. The lockup clutch 6 is disposed in a space between the front cover 2 and the turbine 4. The lockup clutch 6 is primarily composed of a piston 41, and an elastic coupling mechanism 42 that serves to couple the piston 41 to the turbine 4.

The piston 41 is a disk shaped member made of sheet metal, has a complex form prepared by drawing, and has an approximately uniform thickness throughout. The piston 41 is axially and circumferentially movable in the space between the front cover 2 and the turbine 4, and is disposed so as to divide this space into a front chamber F the front cover 2 side and a rear chamber R on the turbine 4 side. The piston 41 moves in the axial direction due to a pressure differential in the working fluid between the front and rear chambers F and R. The piston 41 is primarily composed of a piston unit 41a that is a disk shaped member. Further, the piston 41 includes an inner peripheral cylindrical portion 43 that extends axially from the inner peripheral edge of the piston 41 toward the engine, and an outer peripheral cylindrical portion 44 that extends axially from the outer peripheral edge of the piston 41 toward the transmission. The inner peripheral cylindrical portion 43 is supported on an outer peripheral surface 23a of the turbine hub 23, and is axially and circumferentially movable relative thereto. In other words, the piston 41 is radially positioned by the turbine hub 23 via the inner peripheral cylindrical portion 43. A seal ring 45 is disposed on the outer peripheral surface 23a of the turbine hub 23. The seal ring 45 is in contact with an inner peripheral surface of the inner peripheral cylindrical portion 43, and seals and divides the front and rear chambers F and R at the inner peripheral portions thereof.

A friction facing 61 is arranged on the engine side of the outer peripheral portion of the piston unit 41a. A friction surface 62 is formed on a portion of the front cover 2 facing the friction facing 61. When the friction facing 61 comes into contact with the friction surface 62 and is frictionally engaged therewith, the front cover 2 transmits torque to the piston 41. In other words, the friction surface 62 and the friction facing 61 form a clutch coupling portion 66.

A support portion 48 is formed on an inner peripheral portion of the piston unit 41a of the piston 41, and more specifically, is formed on the innermost peripheral portion thereof (the portion that continues from the cylindrical portion 43). The support portion 48 supports the thrust load of the turbine 4. The support portion 48 is an annular portion having a constant radial width, and includes a flat surface 48a on the flange 24 side which extends perpendicular to the rotation axis O—O. In addition, the flange 24 has a flat surface 24a on the support portion 48 side. The flat surfaces 48a and 24a can be axially spaced from each other. However, the flat surfaces 48a and 24a are in contact with each other when the lockup clutch is in the released state shown in the Figure, and are also in contact with each other when the lockup clutch is in the engaged state (described below). In other words, the flat surfaces 48a and 24a of the support portion 48 and the flange 24 form a contact support portion 65. The support portion 48 has a radial width that is larger than the thickness of the piston 41, and is at least two or more times as large as the thickness of piston 41. The radial width of the support portion 48 is preferably in a range three or four times larger (or more) than the thickness of the piston 41.

A transmission side surface 63 of the inner peripheral portion of the front cover 2 and an engine side surface 23b of the turbine hub 23 are opposing portions that face each other across an axial space. There are no other members disposed between the transmission side surface 63 and the engine side surface 23b, i.e., the transmission side surface 63 and the engine side surface 23b directly face each other in the axial direction. The Figure shows a state in which the lockup clutch 6 is released, and in particular shows a state in which the piston 41 has moved to the furthest position away from the front cover 2 (a state in which the piston 41 has moved in the axial direction to the greatest extend possible toward the transmission side). Accordingly, a first axial space 71 of a size G1 is maintained between the friction surface 62 and the friction facing 61 in the clutch coupling portion 66, and a second axial space 72 of a size G2 is maintained between the transmission side surface 63 and the engine side surface 23b. Since G1 is much smaller than G2, an axial space can be maintained between the transmission side surface 63 of the inner peripheral portion of the front cover 2 and the engine side surface 23b of the turbine hub 23 in the clutch engaged state, even when bending or deflection occurs in the piston 41. Note that in this embodiment, the axial position of the end of the inner peripheral cylindrical portion 43 of the piston 41 matches with the axial position of the engine side surface 23b of the turbine hub 23. In other words, the axial position of the end of the inner peripheral cylindrical portion 43 of the piston 41 is in axial alignment with the axial position of the engine side surface 23b of the turbine hub 23.

The elastic coupling mechanism 42 serves to elastically couple the piston 41 and the turbine 4 together in the rotational direction. The elastic coupling mechanism 42 is disposed between the piston 41 and the turbine 4, and more specifically, between the vicinity of the outer peripheral cylindrical portion 44 and the outer peripheral portion of the turbine shell 21. The elastic coupling mechanism 42 is composed of a retaining plate 51 that serves as a drive side member, a driven plate 52 that serves as a driven side member, and a plurality of coil springs 53 disposed between the plates 51 and 52. The retaining plate 51 is an annular plate member disposed on the inner peripheral side of the outer peripheral cylindrical portion 44. The retaining plate 51 serves to retain the coil springs 53, and engage with circumferentially opposite ends of each coil spring 53 in order to transmit torque. The retaining plate 51 includes retaining portions 54, 55 that respectively support the outer peripheral and inner peripheral sides of the plurality of coil springs 53 arranged in the circumferential direction. The inner peripheral side of the retaining portion 54 is formed by partially cutting and bending the retaining plate 51. In addition, the retaining plate 51 includes engagement portions 56, 57 that serve to support the circumferentially opposite ends of each coil spring 53. The engagement portions 56, 57 are formed by partially cutting and bending the retaining plate 51. The driven plate 52 is an annular plate that is fixed to the rear surface of the outer peripheral portion of the turbine shell 21. A plurality of claws 58 are formed on the driven plate 52 at a plurality of positions in the circumferential direction, and extend toward the engine. The claws 58 are disposed so that they can be engaged with the circumferentially opposite ends of each coil spring 53. This configuration allows torque to be transmitted from the retaining plate 51 to the driven plate 52 via the coil springs 53.

Operation

The operation of the torque converter 1 will be described below.

Lockup Clutch in the Released State

When the torque is transmitted from the engine to rotate the front cover 2, the impeller 3 fixed to the front cover 2 will also rotate. This allows the working fluid to flow from the impeller 3 to the turbine 4 and rotate the turbine 4. This in turn allows the torque transmitted to the turbine 4 to be transmitted to the main drive shaft (not shown in the figures).

At this point, the piston 41 of the lockup clutch 6 moves to the turbine side due to the pressure differential of the working fluid in the front and rear chambers F and R, and an axial space is thereby maintained in the clutch coupling portion 66.

Lockup Clutch in the Engaged State

When the fluid is drained from the front chamber F, the pressure differential of the working fluid in the front and rear chambers F and R moves the piston 41 toward the front cover 2 side. When the friction facing 61 of the piston 41 thus moved comes into contact with the friction surface 62 of the front cover 2, the clutch coupling portion 66 will be in the clutch engaged state. In this state, the front cover 2 directly transmits the torque to the turbine 4.

When the lockup clutch is in the engaged state, a force will be applied to the turbine 4 in the axial direction that urges the turbine 4 toward the engine. Because of this, the thrust load of the turbine 4 will be applied to the piston 41. The piston 41 will receive the thrust load of the turbine 4 via the support portion 48 when the clutch coupling portion 66 is in contact with the front cover 2. When this occurs, the axial space 72 will be maintained between the transmission side surface 63 of the front cover 2 and the engine side surface 23b of the turbine hub 23.

When variations in torque are input from the engine to the front cover 2, the coil springs 53 in the elastic coupling mechanism 42 will be compressed in the rotational direction between the retaining plate 51 and the driven plate 52. As a result, the elastic coupling mechanism 42 will absorb the torsional vibrations. When the elastic coupling mechanism 42 operates, sliding occurs in the rotational direction of the contact support portion 65, and more particularly between the support portion 48 of the piston 41 and the flange 24 of the turbine hub 23 which are pressed against each other in the axial direction. In this embodiment, however, the bearing stress of the contact support portion 65 will be low, and thus little wear will be produced, because the support portion 48 is an annular portion having a constant radial width.

As described above, the following effects will be obtained by adopting a structure that supports the thrust load of the turbine 4 by means of the piston 41.

(1) Elimination of the Thrust Washer (1-1) The number of parts can be reduced by eliminating the thrust washer. As a result, costs will be reduced.

(1-2) By eliminating the thrust washer, it will no longer be necessary to improve the precision of the sliding surfaces of the front cover and the turbine hub, and thus the number of processing steps can be reduced as well as costs.

(1-3) The space occupied by the inner peripheral portion of the torque converter in the axial direction can be reduced by eliminating the thrust washer.

(1-4) A reduction in weight can be achieved by elimination of the thrust washer.

(2) Improvement of the lockup clutch

In this embodiment, the clutch coupling portion 66 is subjected to a load applied from the piston 41 and a load applied from the turbine 4. In other words, the pushing load in the lockup clutch 6 is larger than that in a conventional structure. As a result, the lockup clutch 6 has an increased torque transmission capacity.

Other Embodiments

The foregoing embodiment is only an example of the present invention and the present invention is not limited thereto. Various modifications and variations are possible without departing from the spirit and scope of the invention. For example, the hydrodynamic torque transmitting device of the present invention not only includes the torque converter described above but also a fluid coupling. In addition, the driven plate of the lockup clutch may be fixed to the turbine hub instead of the outer peripheral portion of the turbine.

The support portion of the piston may be in contact with a portion of the turbine hub other than the flange. In other words, the support portion of the piston may be in contact with the main portion of the turbine hub or the turbine shell.

The elastic coupling mechanism may be composed of a pair of plates which support axially opposite sides of the coil springs, and a plate interposed therebetween.

The clutch coupling portion may have a structure that maintains a plurality of friction surfaces.

In the hydrodynamic torque transmitting device according to the present invention, the support portion of the piston axially supports the turbine in the lockup-engaged state, and as a result, an axial space is maintained between the opposing portions when the piston is in the position closest to the front cover, and the load from the turbine will not applied to the front cover. Thus, in contrast to the conventional configuration, the thrust washer can be eliminated because the piston bears the thrust load of the turbine.

Any terms of degree used herein, such as "substantially", "about" and "approximately", mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2003-119041. The entire disclosure of Japanese Patent Application No. 2003-119041 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A hydrodynamic torque transmitting device, comprising:
 an input side front cover;
 an impeller being coupled to the front cover to form a fluid chamber therewith;
 a turbine having a turbine hub, and a vane portion disposed inside the fluid chamber and opposite the impeller;
 a piston having a disk-shaped main body, a frictional coupling portion disposed on an outer peripheral portion of the main body being configured to couple frictionally with the front cover, and a support portion being configured to support the turbine in the axial direction when the piston moves toward the front cover, the support portion having a flat surface axially contacting the turbine and a cylindrical portion extending axially from an innermost peripheral edge of the piston, the flat surface and the cylindrical portion being arranged to extend from the innermost peripheral edge, the piston being disposed to divide a space between the front cover and the turbine into a front chamber on a front cover side and a rear chamber on a turbine side and being configured to move toward and away from the front cover by a pressure differential created by fluid between the front chamber and rear chamber; and an elastic coupling mechanism being arranged at an outer peripheral portion of the turbine and the piston to couple the turbine and the piston, the turbine hub and the front cover respectively including opposing portions being mutually opposed to each other across a space in an axial direction, and the opposing portions being configured to maintain a gap in the axial direction therebetween to prevent a load from the turbine being applied to the front cover when the piston moves to a position closest to the front cover.

2. The hydrodynamic torque transmitting device according to claim 1, wherein the opposing portions are directly opposite each other in the axial direction, and the axial distance between the opposing portions is longer than the axial distance between the frictional coupling portion and the front cover when the piston moves to a position furthest from the front cover.

3. The hydrodynamic torque transmitting device according to claim 1, wherein the support portion of the piston is an annular portion having a constant radial width.

4. The hydrodynamic torque transmitting device according to claim 3, wherein the radial width of the support portion of the piston is larger than a plate thickness of the piston.

5. The hydrodynamic torque transmitting device according to claim 4, wherein the radial width of the support portion of the piston is two or more times larger than the plate thickness of the piston.

6. The hydrodynamic torque transmitting device according to claim 5, wherein the radial width of the support portion of the piston is three to four times larger than the plate thickness of the piston.

7. The hydrodynamic torque transmitting device according to claim 1, wherein the turbine side of the support portion of the piston has a flat surface that extends perpendicular to the rotation axis.

8. The hydrodynamic torque transmitting device according to claim 1, wherein the piston includes a cylindrical portion that extends from an inner peripheral edge of the main body of the piston toward the front cover, and the inner peripheral surface of the cylindrical portion is supported on an outer peripheral surface of the turbine hub such that the cylindrical portion is movable in a rotational direction and the axial direction.

9. The hydrodynamic torque transmitting device according to claim 7, wherein a portion of the turbine hub that is in contact with the cylindrical portion includes a seal member that seals an inner peripheral portion between the front chamber and the rear chamber.

10. The hydrodynamic torque transmitting device according to claim 1, wherein the axial position of the axial end of the cylindrical portion being in axial alignment with an axial engine side surface of the turbine hub.

11. The hydrodynamic torque transmitting device according to claim 10, wherein the radial width of the support portion of the piston is three to four times larger than the plate thickness of the piston.

12. The hydrodynamic torque transmitting device according to claim 10, further comprising an elastic coupling mechanism arranged at an outer peripheral portion of the turbine and the piston to couple the turbine and the piston.

13. The hydrodynamic torque transmitting device according to claim 12, wherein the elastic coupling mechanism has a driven plate fixed to the turbine.

14. The hydrodynamic torque transmitting device according to claim 13, further comprising a stator having a shell supported via a one-way clutch, a first thrust bearing axially disposed between the shell and an impeller hub of the impeller, and a second thrust bearing axially disposed between the one-way clutch and a flange of the turbine hub.

15. The hydrodynamic torque transmitting device according to claim 1, wherein the elastic coupling mechanism has a driven plate fixed to the turbine.

16. The hydrodynamic torque transmitting device according to claim 15, further comprising a stator having a shell supported via a one-way clutch, a first thrust bearing axially disposed between the shell and an impeller hub of the impeller, and a second thrust bearing axially disposed between the one-way clutch and a flange of the turbine hub.

17. The hydrodynamic torque transmitting device according to claim 1, wherein the piston has an outer peripheral cylindrical portion extending axially from the outer peripheral edge of the main body toward the transmission, and the elastic coupling mechanism has a plurality of elastic members disposed on an inner peripheral side of the outer peripheral cylindrical portion, a driven member fixed to the turbine, retaining the elastic members, and supporting the circumferentially opposite ends of each elastic member, and a drive member fixed to the turbine and supporting the circumferentially opposite ends of each elastic member.

18. The hydrodynamic torque transmitting device according to claim 17, wherein the driven member is inserted between the elastic members in the axial direction.

* * * * *